Dec. 7, 1926.
W. F. KASPER
MAGNETO MOUNTING
Filed March 7, 1922
1,609,948
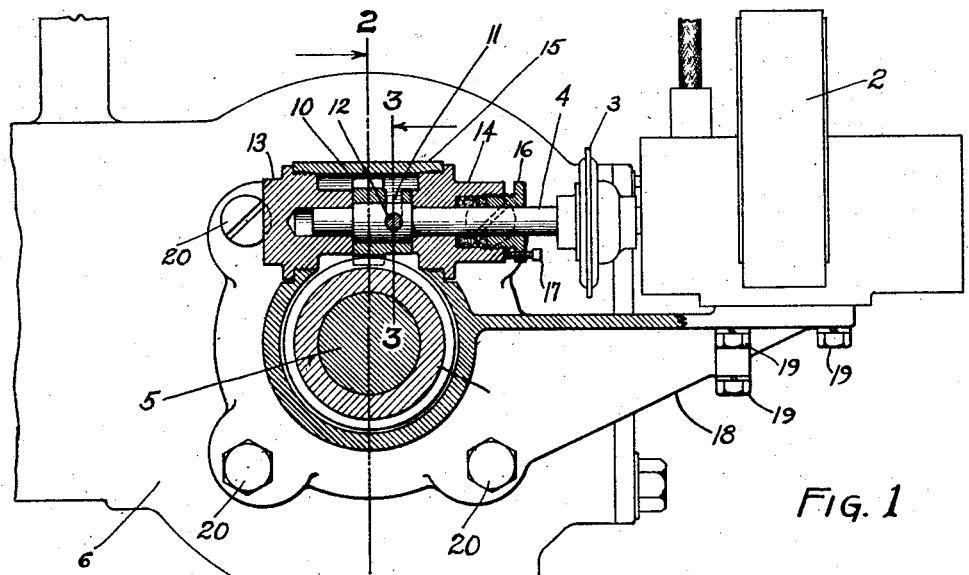
FIG. 1
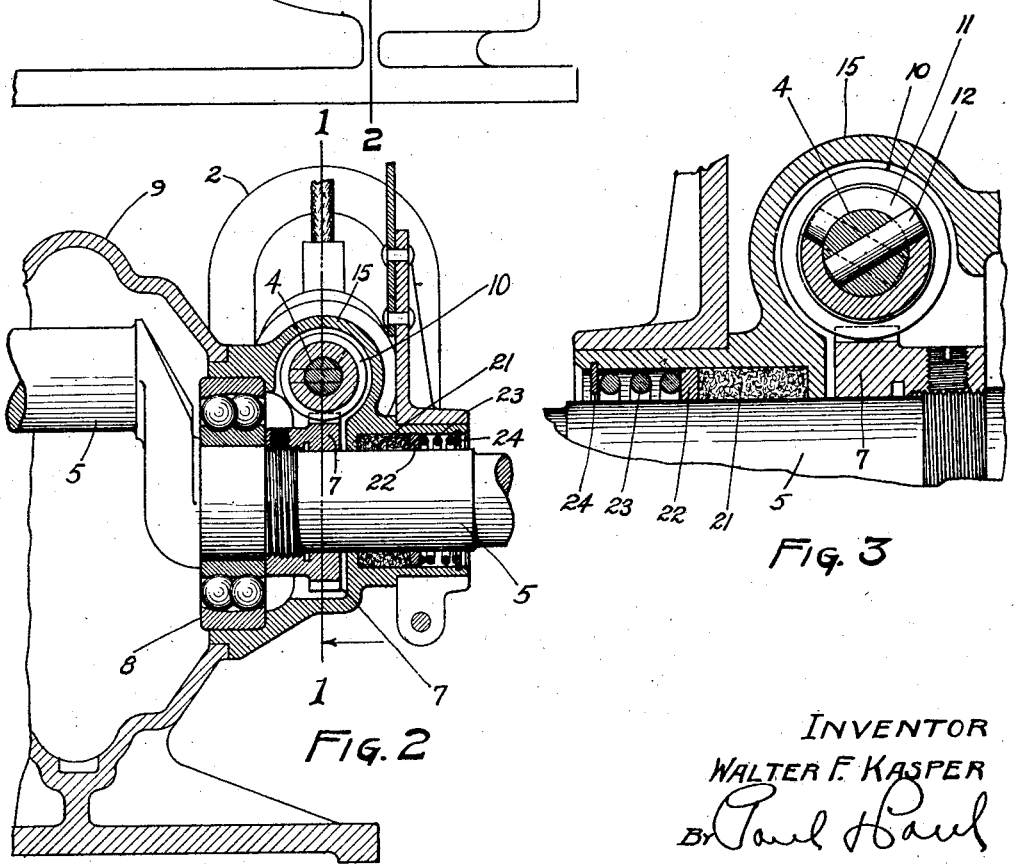
FIG. 2
FIG. 3
INVENTOR
WALTER F. KASPER
BY Paul Paul
ATTORNEY Patented Dec. 7, 1926.

1,609,948

UNITED STATES PATENT OFFICE.

WALTER F. KASPER, OF FAIRMONT, MINNESOTA, ASSIGNOR TO FAIRMONT GAS ENGINE & RAILWAY MOTOR CAR COMPANY, OF FAIRMONT, MINNESOTA, A CORPORATION OF MINNESOTA.

MAGNETO MOUNTING.

Application filed March 7, 1922. Serial No. 541,847.

The object of my invention is to mount a magneto on the engine so that the engine may be operated in either direction and the gearing and shafting lubricating by the oil mixed with the gasoline to lubricate the engine, thereby eliminating the necessity of outside lubrication for the magneto driving device.

Other objects of the invention will appear from the following detailed description.

The invention consists generally in various constructions and combinations, all as hereinafter described and particularly pointed out in the claims.

In the accompanying drawings forming part of this specification,

Figure 1 is a vertical sectional view on the line 1—1 of Figure 2,

Figure 2 is a vertical sectional view on the line 2—2 of Figure 1,

Figure 3 is a sectional view on the line 3—3 of Figure 1, looking in the direction of the arrow.

In the drawing, 2 represents the magneto driven by a flexible coupling 3 that is secured to the magneto drive shaft 4. 5 represents the crank shaft of the engine 6. A helical gear 7 is secured to the crank shaft near the bearings 8 therefor in the crank case 9 of the engine, and a similar gear 10 is loosely mounted on the shaft 4, which is mounted in suitable bearings at right angles to the axis of the crank shaft 5.

The gear 10 has a slot 11 therein and a pin 12 is mounted in the shaft 4 in position to engage the end walls of the slot and operate the drive shaft 4 in the desired direction. Suitable bearings 13 and 14 are tapped into the housing 15 on the shaft 4 and a packing nut 16 is mounted in the bearing 14 and secured by a set screw 17. The magneto is mounted on the supporting bracket 18 by the cap screws 19. Bolts 20 secure the bracket 18 to the walls of the engine crank case.

The packing 21 is held in place by a washer 22, spring 23, and a split lock ring 24. By this means the magneto is positively driven from the crank shaft, with provision for operating the engine in either direction, the lubrication of the crank shaft in its bearing at the same time suitably lubricating the magneto operating gearing and shaft.

I claim as my invention:

1. The combination with a gas-engine crank-shaft provided with a gear, of a magneto drive-shaft, a gear loosely mounted on said shaft and in mesh with the crank-shaft gear and formed with a peripherally extending elongated slot, and a pin projecting radially from the magneto drive-shaft and entering the slot of the loosely mounted gear for changing the direction of rotation of the magneto drive-shaft on change of direction of rotation of the loosely mounted gear.

2. The combination with a gas-engine crank-shaft provided with a gear, of a magneto drive-shaft, a gear formed with an elongated slot extending from the interior to the periphery of the hub of the gear and loosely mounted directly upon the magneto drive-shaft, and a pin projecting from the magneto drive-shaft at right angles thereto to enter the elongated slot of the loosely mounted gear for engagement with one of the end walls of the slot to change the direction of rotation of the magneto drive-shaft.

3. The combination with a gas-engine crank-shaft provided with a gear, of a magneto drive-shaft, a gear formed with an elongated slot and loosely mounted on the magneto drive-shaft, a pin projecting from the magneto drive-shaft to enter the elongated slot of the loosely mounted gear in position for engagement with one of the end walls of the slot to change the direction of rotation of the magneto drive-shaft, and a housing supported from the crank-shaft and enclosing the two gears and having communication with the space occupied by each gear and the crank-shaft for transmission of a lubricant to both gears from within the housing.

In witness whereof, I have hereunto set my hand this 28th day of February, 1922.

WALTER F. KASPER.